July 26, 1927.

F. L. DEWEY 1,636,810

ROLLING COLTER

Filed Dec. 2, 1926

2 Sheets-Sheet 1

Inventor.
Frederick L. Dewey.
By H. P. Doolittle
Atty.

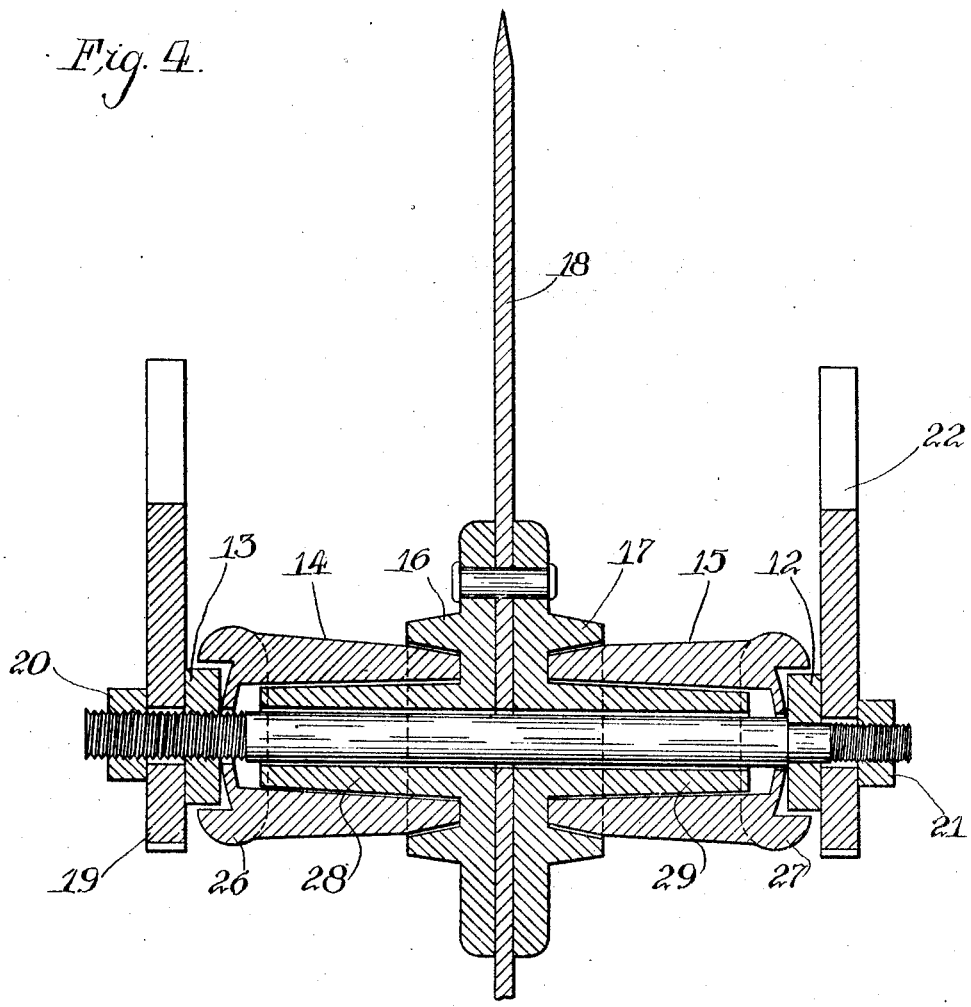
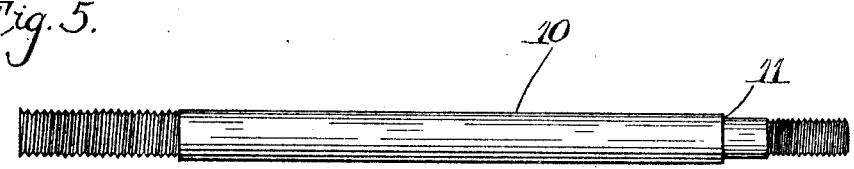

Patented July 26, 1927.

1,636,810

UNITED STATES PATENT OFFICE.

FREDERICK L. DEWEY, OF CANTON, ILLINOIS, ASSIGNOR TO INTERNATIONAL HARVESTER COMPANY, A CORPORATION OF NEW JERSEY.

ROLLING COLTER.

Application filed December 2, 1926. Serial No. 152,098.

This invention relates to a rolling colter and more particularly to rolling colter constructions having a support on each side of the colter disk, each support being secured to a plow beam or the like.

It is an object of the invention to provide a rolling colter construction which may be successfully applied to plows of various kinds and sizes.

It is also an object of the invention to provide a rolling colter construction, the bearings of which may be cleaned, repaired, and adjusted with utmost facility.

It is a further object of the invention to improve a rolling colter construction having a support at each end of its arbor in such a manner that the supports may be adjusted to different widths of plow beams at their upper ends and still maintain the proper degree of tension upon the bearing construction for the colter.

It is also an object of the invention to provide a bearing construction for rolling colters, the parts of which may be disassembled for repair without incurring the liability of substantially changing the tension upon the bearing when its parts are reassembled.

A structure illustrative of the invention is shown in the accompanying drawings, in which—

Figure 1:
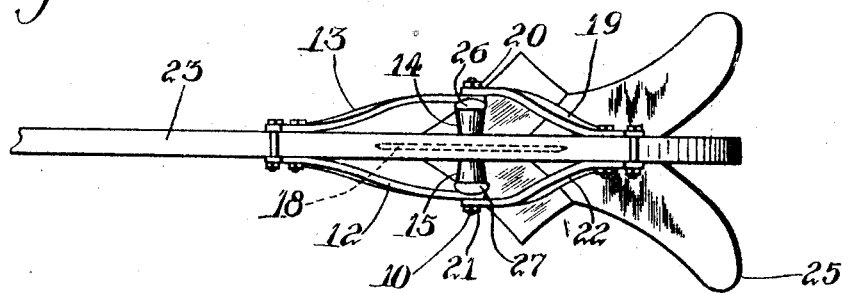
Figure 2:
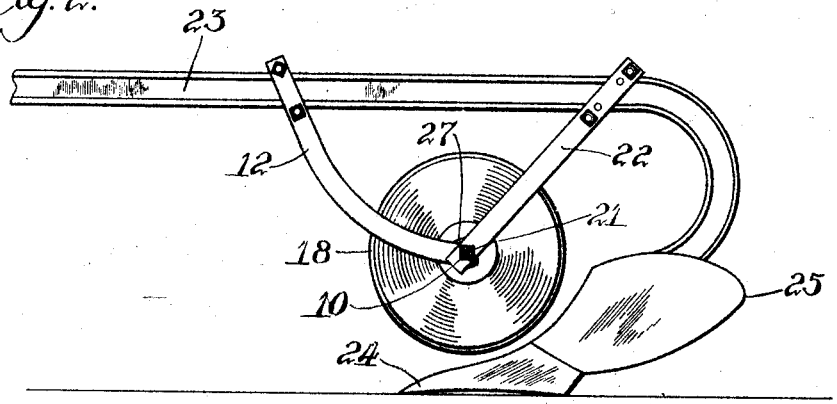
Figure 3:
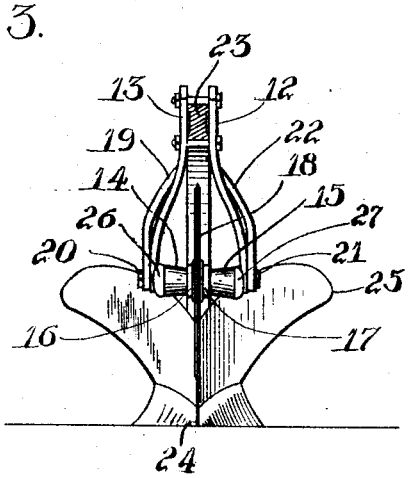

Figure 1 is a plan;
Figure 2 is a side elevation;
Figure 3 is a front elevation;
Figure 4 is a vertical, transverse sectional view; and
Figure 5 is a detail view in elevation.

The illustrative colter construction comprises an arbor 10 preferably formed so as to provide an abutment 11 against which a stop 12 is held so as to always be located in a definite position along the length of the arbor. At the other end of the arbor there is located a tensioning member 13 preferably screw threaded upon the arbor, as shown. Interposed between the stop 12 and the tension member 13 are the bearing members 14 and 15, which contact respectively with complementary bearing members 16 and 17, fixedly secured upon opposite sides of the colter disk 18.

In the structure shown, a support 19 surrounds the left hand end of the arbor 10 and abuts against the tension member 13. The support 19 is normally pressed against the member 13 by a nut 20, which has somewhat the effect of a lock nut in normally preventing relative rotation of the parts 13, 19 and 20. At the other end of the colter construction, it will be noted that the abutment 11 is herein represented as a shoulder formed on the arbor 10. The stop 12 is normally pressed tight against this shoulder by means of a nut 21 screw threaded upon the end of the arbor. Interposed between the nut 21 and the stop 12 is an upright 22.

In the use of colter constructions of the type herein disclosed, considerable difficulty has been experienced owing to the different sizes and kinds of plows to which the colters have been applied. Some plow beams are much thicker than others and are also located at greater heights. This and various other conditions call for the bending of such members as are herein shown at 19 and 22. These are the supports which secure the colter construction to the plow beam, and, if their upper ends are bent inwardly from the positions in which they are tightened upon the colter bearings, destructive strains are imposed upon the bearing structures because of the resultant binding. In the present structure such binding is eliminated by reason of the fact that the members 12 and 13 provide relatively fixed stops held fixed in certain definite relationship upon the arbor 10. In the present instance the member 12 is prevented from moving inwardly by reason of the abutment 11 upon the arbor, and the member 13 is prevented from moving inwardly and binding upon the bearing parts by reason of the fact that it is screw threaded upon the arbor and locked in a certain position thereon. It will be appreciated that the bending of the members 19 and 22 can have no appreciable binding effect upon the bearing parts when these members act against such stops or abutments, which are not depending upon relatively movable bearing parts for their securement in permanent positions.

In the structure disclosed, the colter disk 18 is supported beneath a plow beam 23 by the members 13, 19, 12 and 22. These members are herein shown as elongated bars, the bars 13 and 22 constituting uprights depending from the plow beam 23, as illustrated in Figure 1 of the drawings. The members 12 and 19 preferably extend from the arbor 10 forwardly and upwardly to the plow beam. Suitable securing devices may be applied to the upper ends of the members 13 and 19 to hold them in proper relationship to the plow beam and to the point 24 of the plow bottom 25.

In case it is ncessary or desirable to take up wear in the bearing construction shown, the nut 20 is loosened and turned so as to be removed away from the member 19. Thereafter the bar 19 is used as a lever and is turned so that it will be moved nearer the stop 12. When this bar has been moved so that the bearing has the desired tightness, the nut 20 is again tightened upon the arbor 10 so that the member 13 is locked in the desired position.

After the above described adjustment has been effected, it is necessary that the members 12 and 22 be brought into alinement with the members 13 and 19. To this end, the members 12 and 22 must be loosened by the backing up of the nut 21 upon the arbor 10. Thereupon the member 22 may be aligned with the member 19 and the bar 12 may be brought into a position corresponding to that of the bar 13. These members are held in this position and the nut 21 is then tightened upon the arbor. This procedure does not vary the tension or pressure upon any of the surfaces of the bearing structure, by reason of the fact that the stop 12 is moved back to exactly the same position which it occupied before the nut 21 was loosened. In other words, the stop 12 was tightly abutted against the shoulder 11 when the wear upon the bearing was being taken up, and it returns to the same position after the members 12 and 22 have been properly adjusted.

It is often necessary that the parts of the colter bearing be disassembled for the purpose of cleaning them, and it is important in such instances that the same tension upon the bearing members be retained. It will be evident from the above description that the described structure enables these results to be advantageously accomplished.

The bearing members 14 and 15 are normally held against rotation by means of opposite shoulders 26 and 27, which are formed so as to receive the bar 13 at one end of the structure and the bar 12 at the opposite end. These relatively fixed bearing members surround sleeves 28 and 29 which are preferably formed integrally with the sectors 16 and 17.

While I have described a specific structure for the purpose of illustrating the invention, it is to be understood that the invention is not limited thereto, but that it is capable of use in various combinations and sub-combinations depending upon the requirements of actual practice.

What is claimed is:

1. In a rolling colter construction, a colter disk normally placed in upright position, a support at each side of the disk, bearing members interposed between each support and the disk, means on one side of the disk for taking up looseness between the bearing elements, and means on the opposite side of the disk for permitting the disassembly of the construction and the replacing of its parts without varying the tightness of adjustment of the bearing elements.

2. In a rolling colter construction, a colter disk, an arbor bolt about which the disk is rotatable, bearing members interposed between the bolt and the disk for rotatably mounting the latter, the arbor bolt being formed with an abutment near one end, a removable support engaging the abutment, said support forming a relatively permanent stop against which the bearing members are adjusted, and means screw threaded upon the bolt near its other end for adjusting the members against said stop.

3. In a rolling colter construction, a colter disk, a support at each side of the disk, bearing members interposed between each support and the disk, a connecting device extending between the supports for maintaining the parts of the colter construction in their operative relationships, said connecting device including a part near one support for facilitating the taking up of looseness in the bearing construction, and a part adjacent the other support for permitting the disassembly of the bearing members and the disk and the reassembly of those parts without changing the degree of tightness to which the colter construction is adjusted.

4. In a rolling colter construction, a colter disk, a support at each side of the disk, bearing members between each support and the disk, an arbor extending between the supports, an abutment provided upon the arbor near one support, a member removably engaging the abutment so as to form a relatively permanent stop against which the bearing members may be adjusted, and means screw threaded upon the opposite end of the arbor so as to permit adjustment of the bearing construction to take up looseness.

5. In a rolling colter construction, a plow beam structure, a colter disk, an arbor bolt about which the disk is rotatable, a bar extending from each end of the arbor bolt to the beam structure, bearing members interposed between the bolt and the disk for rotatably mounting the latter, the arbor bolt being formed with a shoulder abutment near one end, a removable support engaging the abutment and perforated to receive one end of the bolt, said support forming a relatively permanent stop against which the bearing members are adjusted, and means screw-threaded upon the bolt near its other end for adjusting the members against said stop.

6. In a rolling colter construction, a plow beam structure, a colter disk, a support at each side of the disk connected at its upper end to the beam structure, bearing members interposed between each support and the disk, a connecting device extending between the supports for maintaining the parts of the colter construction in their operative relationships, said connecting device including a screw-threaded part near one support for facilitating the taking up of looseness in the bearing construction, a fixed abutment adjacent the other support for permitting the disassembly and re-assembly of the bearing members and the disk without changing the degree of tightness to which the colter contruction is adjusted, a stop perforated to receive the end of the connecting device, and means for normally holding the stop tight against the abutment.

7. A rolling colter construction comprising, in combination, an arbor formed so as to provide an abutment near one end, a stop normally engaging the abutment, a tensioning member screw-threaded upon the opposite end of the arbor, a colter disk rotatable about the arbor intermediate its ends, bearing members between the stop and the disk, bearing members between the tensioning means and the disk, a plow beam construction, a support adjacent the tensioning means and surrounding the arbor, a second support adjacent the stop, and means engaging the second support and normally holding the stop tightly against the abutment.

In testimony whereof I affix my signature.

FREDERICK L. DEWEY.